(12) United States Patent
Shigihara et al.

(10) Patent No.: US 7,804,397 B2
(45) Date of Patent: Sep. 28, 2010

(54) VALVE-INTEGRATED TRANSPONDER

(75) Inventors: Makoto Shigihara, Fukushima-ken (JP); Takashi Sano, Fukushima-ken (JP); Michiya Katou, Gifu-ken (JP)

(73) Assignees: Alps Electric Co., Ltd., Tokyo (JP); Pacific Industrial Co., Ltd., Gifu-ken (JP)

( * ) Notice: Subject to any disclaimer, the term of this patent is extended or adjusted under 35 U.S.C. 154(b) by 329 days.

(21) Appl. No.: 12/133,696

(22) Filed: Jun. 5, 2008

(65) Prior Publication Data

US 2008/0303672 A1 Dec. 11, 2008

(30) Foreign Application Priority Data

Jun. 7, 2007 (JP) ............... 2007-151633

(51) Int. Cl.
*B60C 23/00* (2006.01)
(52) U.S. Cl. ............ 340/447; 73/146.4; 73/146.5; 73/146.8; 116/34 R; 340/445; 343/711; 343/712
(58) Field of Classification Search ......... 340/442–447; 73/146.4–146.8; 343/711–712; 116/34 R; 152/152.1
See application file for complete search history.

(56) References Cited

U.S. PATENT DOCUMENTS

| | | | |
|---|---|---|---|
| 6,194,998 B1* | 2/2001 | Huang | 340/442 |
| 6,708,558 B2* | 3/2004 | Saheki | 73/146.5 |
| 6,993,962 B1* | 2/2006 | Ko | 73/146.5 |
| 7,015,804 B2* | 3/2006 | Okubo et al. | 340/447 |
| 7,453,415 B2* | 11/2008 | Shigihara et al. | 343/872 |
| 2006/0272402 A1* | 12/2006 | Yin et al. | 73/146.8 |
| 2006/0273890 A1* | 12/2006 | Kontogeorgakis et al. | 340/445 |
| 2007/0103285 A1* | 5/2007 | Konno et al. | 340/447 |

FOREIGN PATENT DOCUMENTS

| | | |
|---|---|---|
| JP | 2006-069389 | 3/2006 |
| JP | 2008-011385 | 1/2008 |

* cited by examiner

*Primary Examiner*—Brent Swarthout
(74) *Attorney, Agent, or Firm*—Beyer Law Group LLP

(57) ABSTRACT

A valve-integrated transponder includes an air valve and a casing that are integrated with each other, and is disposed within a tire. The air valve is press-fitted to a valve hole in a wheel rim. The casing houses a substrate having a detecting element mounted thereon, an inverse F antenna element, a supporting member, and the like, and is provided with a partition-like reinforcement rib. The reinforcement rib extends along an extension of an axis of the air valve and is loosely fitted in a recessed slot of the supporting member. The antenna element supported by the supporting member has a substantially line symmetrical shape where a pair of radiation conductors symmetrically extend away from each other.

6 Claims, 4 Drawing Sheets

VALVE-INTEGRATED TRANSPONDER

CLAIM OF PRIORITY

This application claims benefit of the Japanese Patent Application No. 2007-151633 filed on Jun. 7, 2007, which is hereby incorporated by reference.

BACKGROUND OF THE INVENTION

1. Field of the Invention

The present invention relates to a valve-integrated transponder that is integrated with an air valve fixed to a valve hole of a wheel rim and is disposed in a tire, and that is used in a system for monitoring the air pressure of the tire.

2. Description of the Related Art

In recent years, more and more vehicles are equipped with a system that enables a driver at the driver seat to monitor the air pressure of the tires. Specifically, such a system is provided for allowing a driver to quickly check the air pressure of the tires and to see whether the air pressure is abnormal while driving a vehicle, and is realized by installing transponders equipped with detecting elements and antenna elements in appropriate positions within the tires. A transponder of this type is integrally joined to, for example, an end of an air valve that is located within a tire. See Japanese Unexamined Patent Application Publication No. 2006-69389 (pages 3 to 5, and FIG. 1) for an example of such a valve-integrated transponder. In this case, the air valve may be of a clamp-in type that is screwed onto a wheel rim or a snap-in type that is press-fitted to a valve hole of a wheel rim. As described in Japanese Unexamined Patent Application Publication No. 2006-69389, an air valve of a snap-in type is advantageous in that it can be readily fitted to a wheel rim. Although the type of built-in antenna to be used in a transponder contained inside a tire is not particularly limited, an inverse F antenna element made by forming a metal plate is advantageous in terms of low fabrication cost and compactness.

A valve-integrated transponder of the related art normally contains a battery power source. However, with a structure equipped with a battery, the frequency of detecting the air pressure of a tire will need to be minimized to expand the life of the battery, and a complicated process will inevitably be necessary when replacing the battery. Recently, a valve-integrated transponder that does not require a battery power source has been proposed. Specifically, in this valve-integrated transponder, the antenna element inside the tire is excited by a radio wave sent from an external antenna in the vehicle body and is supplied with a signal current based on information detected by the detecting element. Such a valve-integrated transponder not requiring a battery can allow for an increase in the frequency of detecting the air pressure of the tire and can thus achieve higher detection accuracy. In addition, the valve-integrated transponder also allows for lower maintenance costs due to not requiring a battery replacement process.

Generally, a radio wave radiating from an antenna element of a valve-integrated transponder is transmitted to an external antenna in the vehicle body by passing through a side wall of a tire. If the radio wave used has a short wavelength and has a strong property of rectilinear propagation, such as a 2.4 GHz radio wave used in a transponder that does not require a battery, it is necessary to increase radiation components of a direct wave directed from the antenna element in the tire towards the side wall. However, with a common inverse F antenna element, a radio wave radiates both upward and sideward from a radiation conductor. This makes it difficult for the radio wave to radiate efficiently towards the side wall of the tire. Regarding a valve-integrated transponder fitted to a snap-in type air valve, the transponder receives a large amount of force when the air valve is being press-fitted to the valve hole of the wheel rim. To enhance the mechanical strength of the transponder, it is desirable to provide a casing, which houses an antenna element and the like, with a reinforcement rib that extends along an extension of the axis of the air valve. However, providing such a reinforcement rib in a manner that it does not come in physical contact with the common inverse F antenna element is problematic in that the casing becomes large in size.

SUMMARY OF THE INVENTION

The present invention provides a valve-integrated transponder in which a radio wave can radiate efficiently from a built-in antenna element towards a side wall of a tire, and in which a casing integrated with an air valve can be increased in mechanical strength without being increased in size.

The present invention provides a valve-integrated transponder that includes a detecting element that detects a condition inside a tire; an inverse F antenna element that outputs information detected by the detecting element to an outside; a synthetic-resin supporting member that supports the antenna element; and a synthetic-resin casing that houses the detecting element, the antenna element, and the supporting member. The casing is joined to an end of an air valve fixed to a valve hole in a wheel rim, the end of the air valve being located inside the tire. A longitudinal direction of each of the antenna element and the supporting member is substantially perpendicular to an axial direction of the air valve. The casing is provided with a partition-like reinforcement rib extending across a space in the casing that accommodates the antenna element, the reinforcement rib extending along an extension of an axis of the air valve. A central section of the antenna element in the longitudinal direction thereof is provided with a feed terminal and a ground terminal, the antenna element having a substantially line symmetrical shape where a pair of radiation conductors extend symmetrically from the feed terminal and the ground terminal toward opposite longitudinal ends of the antenna element. The supporting member has a recessed slot in which the reinforcement rib is loosely fitted, the recessed slot being located between the pair of radiation conductors.

As described above, the valve-integrated transponder fitted with the air valve in this manner contains the inverted F antenna element, and this antenna element has a substantially line symmetrical shape with the two radiation conductors extending symmetrically toward the opposite longitudinal ends of the antenna element from the central section thereof where the feed terminal and the ground terminal are provided. Thus, the radiation fields above the radiation conductors cancel each other out, thereby increasing the field intensity of radio waves radiating laterally from the radiation conductors. This allows for efficient radiation of radio waves from the antenna element contained in the valve-integrated transponder towards the side wall of the tire. Furthermore, in order to enhance the mechanical strength, the casing of the valve-integrated transponder is provided with the partition-like reinforcement rib that extends across the space accommodating the antenna element while being located on an extension of the axis of the air valve. Consequently, when the air valve is being press-fitted to the valve hole of the wheel rim, the casing can be prevented from being damaged. In addition, since the reinforcement rib of the casing is loosely fitted in the recessed slot of the supporting member, which is located between the two radiation conductors of the antenna element, the casing does not need to be increased in size for avoiding contact between the reinforcement rib and the antenna element.

In the above configuration, it is preferable that the antenna element be made by forming a metal plate so that the manufacturing cost of the antenna element can be reduced. In this case, the supporting member may have a central erected portion that defines a contour of the recessed slot and a pair of holder surfaces extending from the central erected portion along the pair of radiation conductors, the central erected portion supporting the feed terminal and the ground terminal, the holder surfaces supporting the radiation conductors. Thus, the antenna element formed of a metal plate can be supported in a stable fashion, whereby the antenna element can be properly prevented from being deformed while the vehicle is running. As an example of a structure for supporting the feed terminal and the ground terminal by utilizing the central erected portion, the ground terminal may be disposed along one side surface of the central erected portion, and the feed terminal may be extended along an inner bottom surface of the recessed slot to another side surface of the central erected portion. Alternatively, the ground terminal may be disposed along one side surface of the central erected portion, and the feed terminal may be disposed along another side surface of the central erected portion.

Furthermore, in the above configuration, it is preferable that the antenna element of the valve-integrated transponder be excited by a radio wave from an external antenna attached to a vehicle body. Consequently, the valve-integrated transponder can allow for an increase in the frequency of detecting the air pressure of the tire and can thus achieve higher detection accuracy. In addition, the valve-integrated transponder also allows for lower maintenance costs due to not requiring a battery replacement process.

DESCRIPTION OF THE PREFERRED EMBODIMENTS

Figure 1:
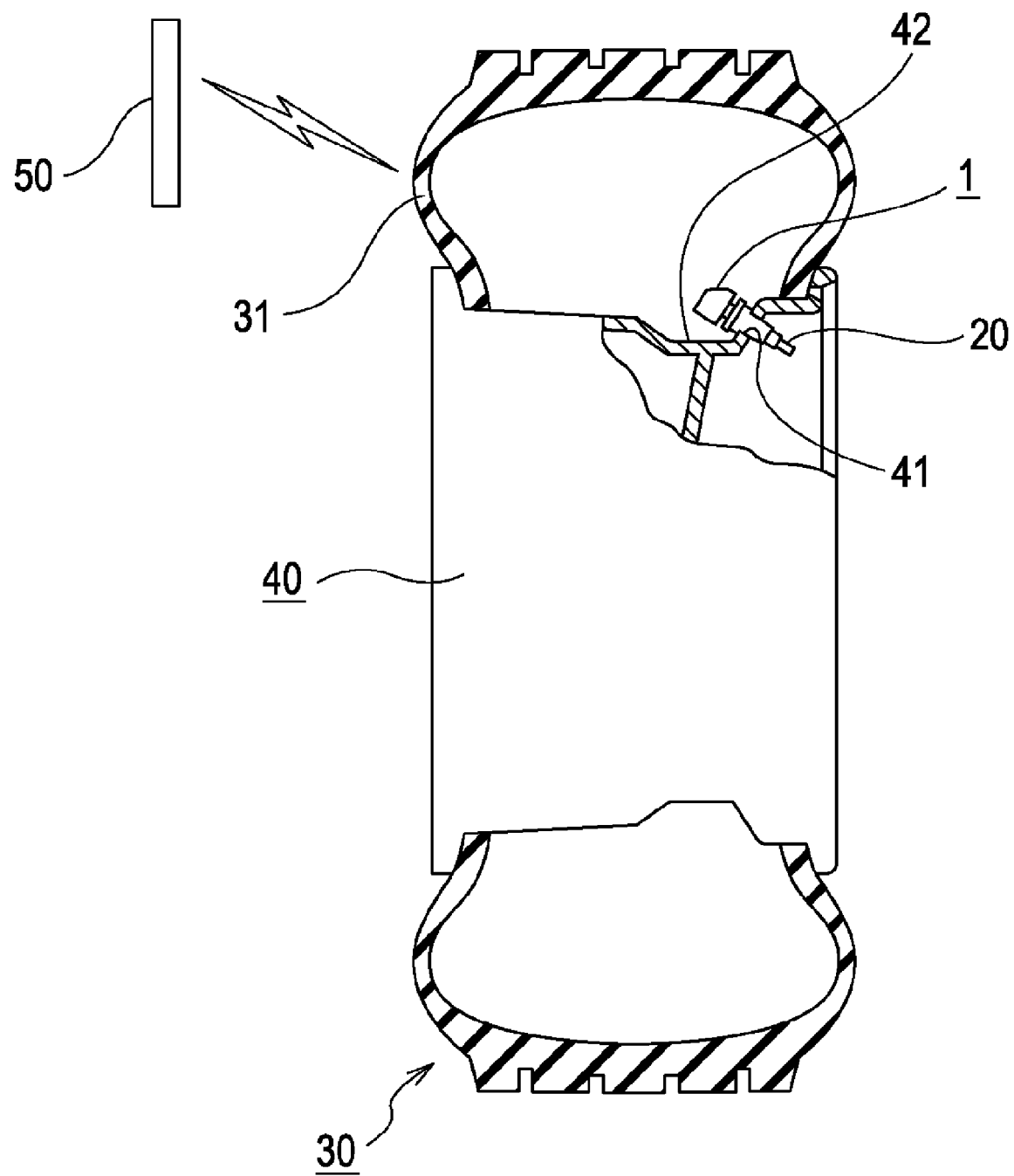
FIG. 1 illustrates a mounting position of a valve-integrated transponder according to a first embodiment of the present invention inside a tire.
Figure 2:
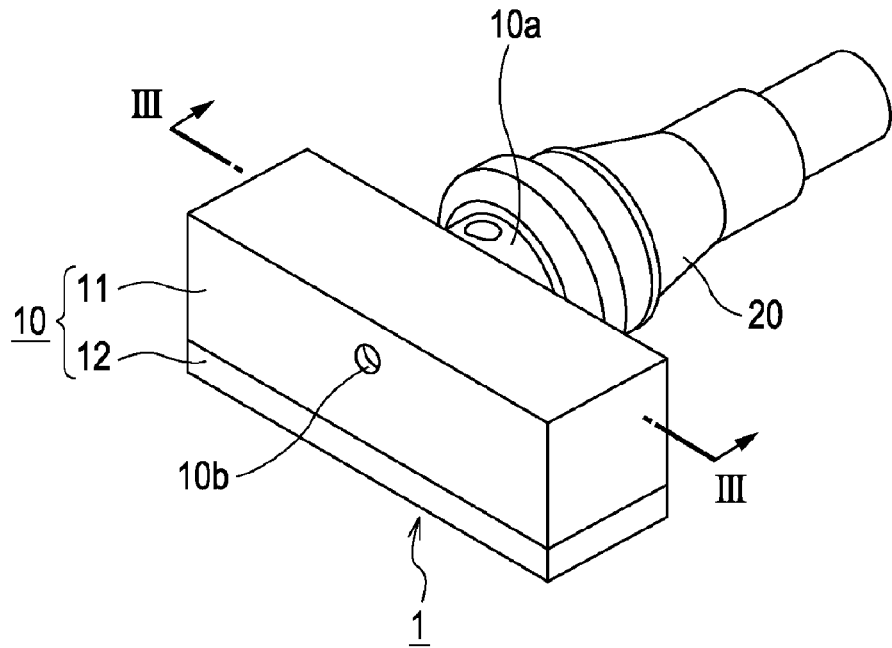
FIG. 2 is an external view of the transponder shown in FIG. 1 and an air valve.
Figure 3:
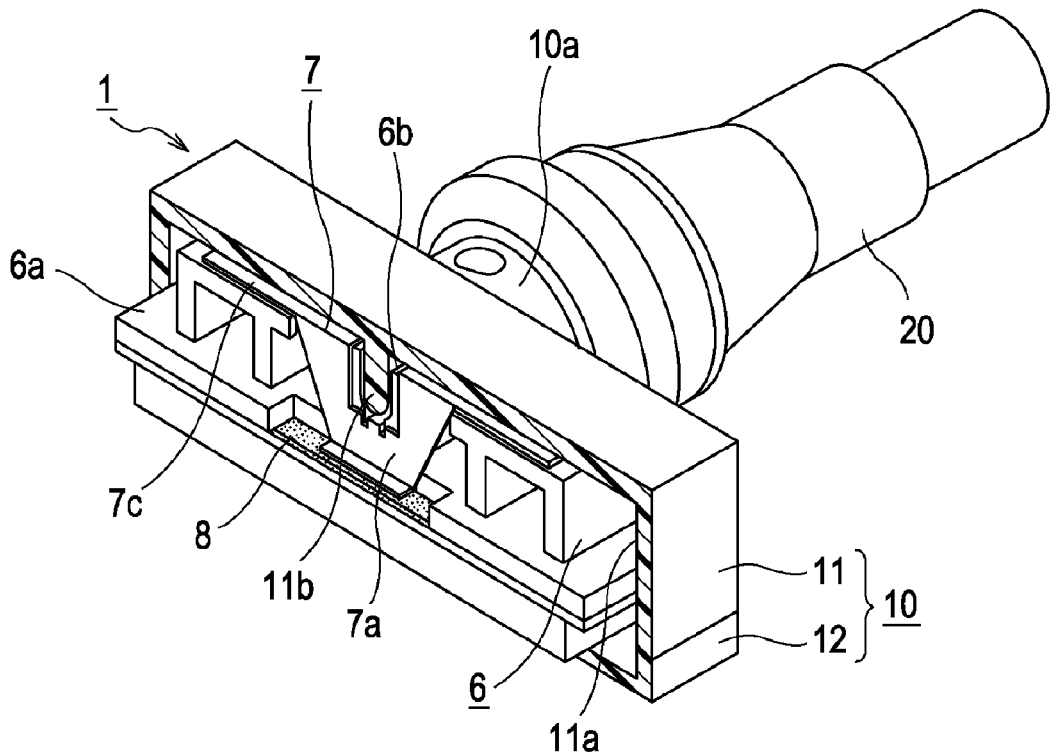
FIG. 3 is a cross-sectional view taken along line III-III in FIG. 2.
Figure 4:
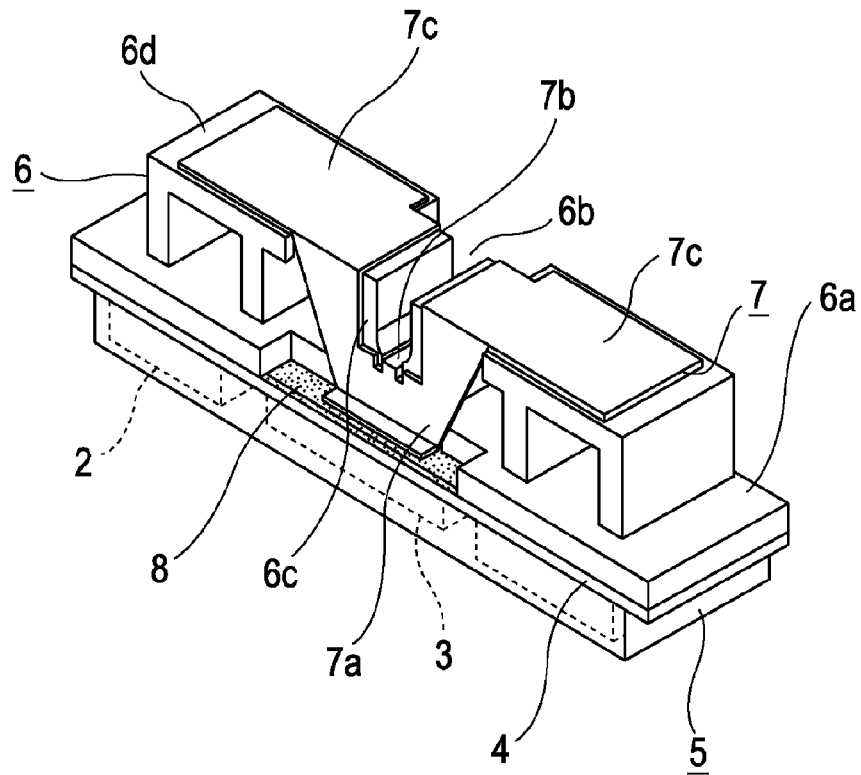
FIG. 4 illustrates the internal structure of the transponder according to the first embodiment as viewed from an external-antenna side.
Figure 5:
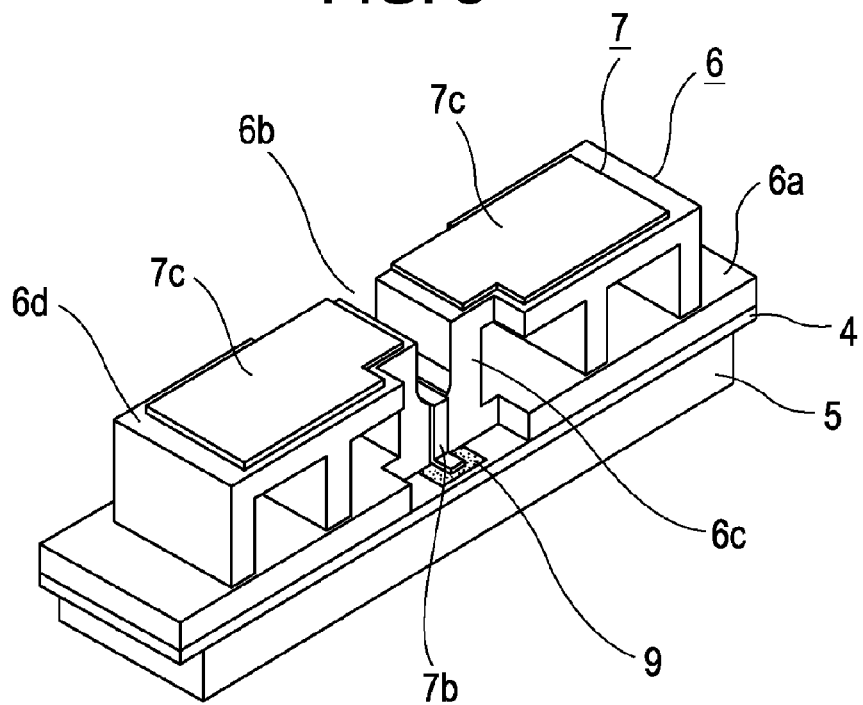
FIG. 5 illustrates the internal structure of the transponder according to the first embodiment as viewed from an air-valve side.

Embodiments of the present invention will now be described with reference to the drawings. FIG. 1 illustrates a mounting position of a valve-integrated transponder according to a first embodiment of the present invention inside a tire. FIG. 2 is an external view of the transponder and an air valve. FIG. 3 is a cross-sectional view taken along line III-III in FIG. 2. FIG. 4 illustrates the internal structure of the transponder as viewed from an external-antenna side. FIG. 5 illustrates the internal structure of the transponder as viewed from an air-valve side.

A valve-integrated transponder 1 shown in these drawings is fitted to one end of a snap-in type air valve 20 and disposed within a tire 30, and is for enabling a driver at the driver seat to monitor the air pressure and temperature inside the tire 30. The transponder 1 has a synthetic-resin casing 10 that houses a detection circuit unit 2 having detecting elements such as a pressure sensor and a temperature sensor, a transmitter/receiver circuit unit 3, a substrate 4 having these circuit units 2 and 3 mounted on a first surface thereof, a shield cover 5 formed of sheet metal that covers both the circuit units 2 and 3, a synthetic-resin supporting member 6 disposed on a second surface of the substrate 4, and an inverse F antenna element 7 that is supported by the supporting member 6 and electrically connected to the transmitter/receiver circuit unit 3. The transponder 1 does not contain a battery power source. Instead, the transponder 1 is configured such that the antenna element 7 is excited by a radio wave from an external antenna 50 (see FIG. 1) provided in the vehicle body. Referring to FIG. 1, the air valve 20 is securely press-fitted in a valve hole 41 of a wheel rim 40, and the casing 10 is attached to an end portion of the air valve 20 that is located within the tire 30, such that the longitudinal direction of the antenna element 7 and the supporting member 6 are set substantially perpendicular to the axial direction of the air valve 20. Consequently, the transponder 1 is disposed within the tire 30 at an outer side of a well 42 of the wheel rim 40 as viewed in the radial direction of the tire 30.

The casing 10 is a housing that is formed by joining together a casing body 11 and a lid body 12. The casing body 11 has a space 11a for accommodating a main portion of the transponder 1. The lid body 12 covers a side of the casing body 11 that exposes the space 11a. A first side surface of the casing body 11 has a central section in the longitudinal direction thereof, from which a connector portion 10a engageable to the air valve 20 extends. On the other hand, a second side surface of the casing body 11 has a central section in the longitudinal direction thereof, which is provided with an air hole 10b that takes in the air in the tire 30. Moreover, referring to FIG. 3, the casing body 11 has therein a partition-like reinforcement rib 11b that extends across the space 11a to separate the space 11a into two sections. The reinforcement rib 11b extends along an extension of the axis of the air valve 20.

The detection circuit unit 2 has the detecting elements such as the pressure sensor and the temperature sensor for detecting the pressure and temperature of the air in the tire 30 that is introduced into the casing 10 through the air hole 10b. The transmitter/receiver circuit unit 3 receives an inquiry signal sent from the external antenna 50 in the vehicle body to the antenna element 7, and also receives a signal (detection signal) based on the detected information from the detection circuit unit 2. The transmitter/receiver circuit unit 3 processes this detection signal and outputs the processed signal to the antenna element 7. The detection circuit unit 2 and the transmitter/receiver circuit unit 3 are mounted on one surface of the substrate 4 (i.e. a first main surface of the substrate 4 that faces the well 42) while being covered with the shield cover 5. Accordingly, the detection circuit unit 2 and the transmitter/receiver circuit unit 3 are electromagnetically shielded by the shield cover 5 and are therefore hardly susceptible to external noise. Referring to FIGS. 4 and 5, a second main surface of the substrate 4 opposite to the first main surface thereof facing the well 42 is provided with a ground electrode 8 and a feed electrode 9, and holds thereon the supporting member 6. This supporting member 6 supports the antenna element 7. The external antenna 50 is installed in a tire house (not shown) of the vehicle body that faces a side wall 31 of the tire 30.

The supporting member 6 includes a flat base portion 6a securely attached on the second main surface of the substrate 4 and a central erected portion 6c extending upright from a central region of the base portion 6a and defining the contour of a recessed slot 6b. The top surface of the supporting member 6 is constituted by a pair of flat holder surfaces 6d. An intermediate region between the holder surfaces 6d in the longitudinal direction of the supporting member 6 is defined by the opening of the recessed slot 6b. Referring to FIG. 3, the reinforcement rib 11b of the casing body 11 is loosely fitted in this recessed slot 6b.

The antenna element 7 is made by forming a metal plate, but has a significantly different shape to that of a common inverse F antenna element. The antenna element 7 is formed into a substantially line symmetrical shape and has a pair of radiation conductors 7c symmetrically extending toward opposite longitudinal ends of the antenna element 7 from a central section in the longitudinal direction thereof where a ground terminal 7a and a feed terminal 7b are disposed. Thus, the radiation fields above the radiation conductors 7c cancel each other out, thereby increasing the field intensity of radio waves radiating laterally from the radiation conductors 7c. The radiation conductors 7c are securely attached on the respective holder surfaces 6d of the supporting member 6, such that the two radiation conductors 7c have the opening of the recessed slot 6b located therebetween. The reinforcement rib 11b loosely fitted in the recessed slot 6b intervenes the two radiation conductors 7c so as to function as a partition. Referring to FIG. 4, the ground terminal 7a is disposed along a first side surface of the central erected portion 6c of the supporting member 6 and is soldered to the ground electrode 8. On the other hand, referring to FIG. 5, the feed terminal 7b is extended along an inner bottom surface of the recessed slot 6b to a second side surface of the central erected portion 6c and is soldered to the feed electrode 9. For transmission and reception of signals between the antenna element 7 and the external antenna 50 in the vehicle body, 2.4 GHz radio waves are used. Therefore, a radio wave sent from the antenna element 7 to the external antenna 50 as a response signal is mainly a direct wave directed from the antenna element 7 towards the side wall 31 of the tire 30.

As mentioned above, the valve-integrated transponder 1 is disposed within the tire 30 by press-fitting the air valve 20 into the valve hole 41 of the wheel rim 40. Although the casing 10 of the transponder 1 receives a large amount of force when the air valve 20 is being press-fitted to the valve hole 41, the casing 10 is given sufficient mechanical strength that prevents it from being damaged during the press-fitting process of the air valve 20. Such mechanical strength is achieved by providing the casing 10 with the partition-like reinforcement rib 11b extending across the space 11a and located on an extension of the axis of the air valve 20.

When such a valve-integrated transponder 1 disposed within the tire 30 receives a radio wave as an inquiry signal from the external antenna 50 in the vehicle body, the antenna element 7 is excited and thus generates a high-frequency current. Then, the information about the air pressure and the temperature in the tire 30 detected by the pressure sensor and the temperature sensor is superposed on this high-frequency current, and the signal current (detection signal) is sent from the detection circuit unit 2 to the transmitter/receiver circuit unit 3. The transmitter/receiver circuit unit 3 processes this detection signal and outputs the processed signal to the antenna element 7. Thus, the antenna element 7 sends a radio wave as a response signal to the external antenna 50.

As described above, in the first embodiment, the inverse F antenna element 7 contained in the valve-integrated transponder 1 has a substantially line symmetrical shape with the radiation conductors 7c extending symmetrically toward the opposite longitudinal ends of the antenna element 7 from the central section in the longitudinal direction thereof where the ground terminal 7a and the feed terminal 7b are disposed. Consequently, the radiation fields above the radiation conductors 7c cancel each other out, whereby the field intensity of radio waves radiating laterally from the radiation conductors 7c is increased. This allows for efficient radiation of radio waves from the antenna element 7 towards the side wall 31 of the tire 30. In other words, the valve-integrated transponder 1 is designed to increase the radiation components of a direct wave directed from the antenna element 7 towards the side wall 31. Accordingly, a radio wave as a response signal can be reliably sent to the external antenna 50 in the vehicle body.

As described above, in order to enhance the mechanical strength, the casing 10 of the valve-integrated transponder 1 is provided with the partition-like reinforcement rib 11b that extends across the space 11a accommodating the antenna element 7 while being located on an extension of the axis of the air valve 20. Consequently, when the air valve 20 is being press-fitted to the valve hole 41 of the wheel rim 40, the casing 10 can be prevented from being damaged. In addition, since the reinforcement rib 11b of the casing 10 is loosely fitted in the recessed slot 6b of the supporting member 6, which is located between the two radiation conductors 7c of the antenna element 7, the casing 10 does not need to be increased in size for avoiding contact between the reinforcement rib 11b and the antenna element 7.

Furthermore, the valve-integrated transponder 1 does not have a battery power source, and is configured such that the antenna element 7 is excited by a radio wave from the external antenna 50 attached to the vehicle body. This configuration allows for an increase in the detection frequency as well as lower maintenance costs. The antenna element 7 can be fabricated at low cost by forming a metal plate. Furthermore, since the antenna element 7 is stably supported by the supporting member 6, the antenna element 7 is highly resistant to deformation.

Figure 6:
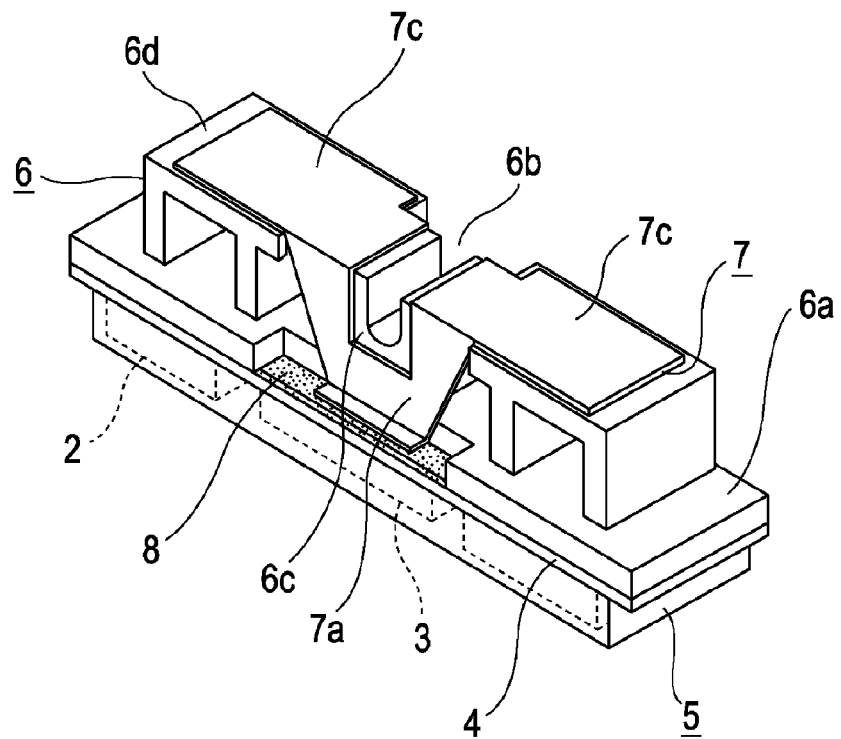
FIG. 6 illustrates the internal structure of a valve-integrated transponder according to a second embodiment of the present invention as viewed from an external-antenna side.
Figure 7:
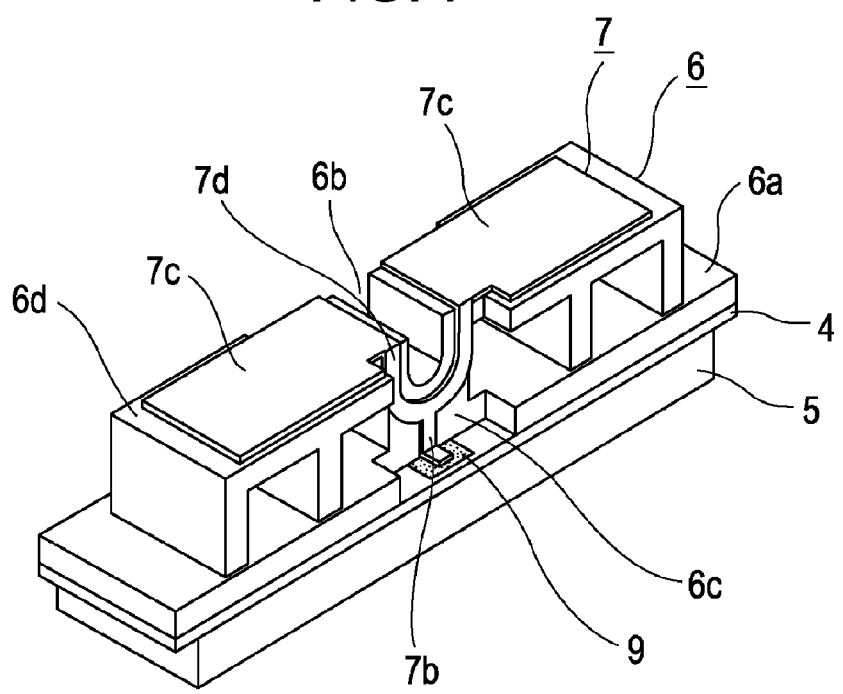
FIG. 7 illustrates the internal structure of the transponder according to the second embodiment as viewed from an air-valve side.

FIG. 6 illustrates the internal structure of a valve-integrated transponder according to a second embodiment of the present invention as viewed from an external-antenna side. FIG. 7 illustrates the internal structure of the transponder as viewed from an air-valve side. The components shown in FIGS. 6 and 7 that correspond to those in FIGS. 4 and 5 are indicated with the same reference numerals, and descriptions of those components will not be repeated.

The second embodiment differs from the first embodiment in the shape of the feed terminal 7b of the antenna element 7. Specifically, referring to FIGS. 6 and 7, the feed terminal 7b has a U-shaped segment 7d and is disposed along a side surface of the central erected portion 6c of the supporting member 6, the side surface being opposite to that provided with the ground terminal 7a. Opposite ends of the U-shaped segment 7d are continuously connected to the pair of radiation conductors 7c that are arranged side by side with the recessed slot 6b therebetween. The feed terminal 7b also has a linear segment that extends downward from the U-shaped segment 7dm. The linear segment is soldered to the feed electrode 9.

Although the air valve described in the above embodiments is of a snap-in type that is press-fitted to a valve hole of a wheel rim, the present invention may alternatively be applied to an air valve of a clamp-in type that is screwed onto a wheel rim.

What is claimed is:

1. A valve-integrated transponder comprising:
   a detecting element that detects a condition inside a tire;
   an inverse F antenna element that outputs information detected by the detecting element to an outside;
   a synthetic-resin supporting member that supports the antenna element; and
   a synthetic-resin casing that houses the detecting element, the antenna element, and the supporting member, wherein the casing is joined to an end of an air valve fixed to a valve hole in a wheel rim, the end of the air valve being located inside the tire, and wherein a longitudinal direction of each of the antenna element and the supporting member is substantially perpendicular to an axial direction of the air valve,
   wherein the casing is provided with a partition-like reinforcement rib extending across a space in the casing that accommodates the antenna element, the reinforcement rib extending along an extension of an axis of the air valve,
   wherein a central section of the antenna element in the longitudinal direction thereof is provided with a feed terminal and a ground terminal, the antenna element having a substantially line symmetrical shape where a pair of radiation conductors extend symmetrically from the feed terminal and the ground terminal toward opposite longitudinal ends of the antenna element, and
   wherein the supporting member has a recessed slot in which the reinforcement rib is loosely fitted, the recessed slot being located between the pair of radiation conductors.

2. The valve-integrated transponder according to claim 1, wherein the antenna element is made by forming a metal plate.

3. The valve-integrated transponder according to claim 2, wherein the supporting member has a central erected portion that defines a contour of the recessed slot and a pair of holder surfaces extending from the central erected portion along the pair of radiation conductors, the central erected portion supporting the feed terminal and the ground terminal, the holder surfaces supporting the radiation conductors.

4. The valve-integrated transponder according to claim 3, wherein the ground terminal is disposed along one side surface of the central erected portion, and wherein the feed terminal is extended along an inner bottom surface of the recessed slot to another side surface of the central erected portion.

5. The valve-integrated transponder according to claim 3, wherein the ground terminal is disposed along one side surface of the central erected portion, and wherein the feed terminal is disposed along another side surface of the central erected portion.

6. The valve-integrated transponder according to claim 1, wherein the antenna element is excited by a radio wave from an external antenna attached to a vehicle body.

* * * * *